(12) United States Patent
Sim

(10) Patent No.: US 8,365,461 B2
(45) Date of Patent: Feb. 5, 2013

(54) LONG LINE FISHING CONNECTOR

(75) Inventor: Woo-Kyung Sim, Paju (KR)

(73) Assignee: Centro Corporation, Koyang (KR)

( * ) Notice: Subject to any disclaimer, the term of this patent is extended or adjusted under 35 U.S.C. 154(b) by 268 days.

(21) Appl. No.: 12/849,825

(22) Filed: Aug. 4, 2010

(65) Prior Publication Data

US 2011/0252692 A1 Oct. 20, 2011

(30) Foreign Application Priority Data

Apr. 16, 2010 (KR) ......................... 10-2010-0035469
Jun. 9, 2010 (KR) ......................... 10-2010-0054577

(51) Int. Cl.
*A01K 91/18* (2006.01)
(52) U.S. Cl. ..................... 43/44.84; 43/44.83
(58) Field of Classification Search ................ 43/43.13, 43/44.83, 44.84, 44.85, 44.87
See application file for complete search history.

(56) References Cited

U.S. PATENT DOCUMENTS

| 3,200,459 | A | * | 8/1965 | Hartman | 24/373 |
| 3,453,703 | A | * | 7/1969 | Wilson | 24/507 |
| 4,149,336 | A | * | 4/1979 | Huse | 43/44.9 |
| 4,665,592 | A | * | 5/1987 | Kasai | 24/601.2 |
| 4,945,671 | A | * | 8/1990 | Jonsson | 43/44.84 |
| 5,251,396 | A | * | 10/1993 | Haigh | 43/42.74 |
| 5,666,759 | A | * | 9/1997 | Thormodsen et al. | 43/42.74 |
| 5,926,996 | A | * | 7/1999 | Frazier | 43/43.1 |
| 6,508,030 | B1 | * | 1/2003 | Sovik | 43/42.74 |
| 6,513,278 | B1 | * | 2/2003 | Jorgensen | 43/44.84 |

FOREIGN PATENT DOCUMENTS

| GB | 2253327 A | * | 9/1992 |
| GB | 2298771 A | * | 9/1996 |
| GB | 2387097 A | * | 10/2003 |
| KR | 20-0279509 | | 6/2002 |
| KR | 20-0441833 | | 9/2008 |

* cited by examiner

*Primary Examiner* — Kimberly Berona
*Assistant Examiner* — Danielle Clerkley
(74) *Attorney, Agent, or Firm* — Lexyoume IP Meister, PLLC.

(57) ABSTRACT

Provided is a long line fishing that prevents a tubular sleeve from separating from the external circumference of a main line no matter how large force may be radially applied from the outside, reduces friction, and makes it possible to quickly and easily connecting a string to a simple connection hook of a swivel. The present invention may be implemented by fitting a plurality of tubular sleeve on a long main line at predetermined positions, disposing clover stoppers at both sides of the tubular sleeves at predetermined positions to prevent the tubular sleeve s from longitudinally moving, and protruding hook from the external circumference by striking the external circumference of the tubular sleeve with a punch through a hole.

3 Claims, 9 Drawing Sheets

LONG LINE FISHING CONNECTOR

CROSS-REFERENCE TO RELATED APPLICATION

This application claims priority to and the benefit of Korean Patent Application Nos. 10-2010-035469 and 10-2010-0054577 filed in the Korean Intellectual Property Office on Apr. 16, 2010 and Jun. 9, 2010, the entire contents of which are incorporated herein by reference.

BACKGROUND OF THE INVENTION (a) Field of the Invention

The present invention relates to long line fishing connector, and more particularly, to a long line fishing connector that improves toughness by structurally improving a sleeve regularly divided to be connected to a main line and a string, and quickly and easily connect the string to a lower ring of a swivel connected to the main line.

(b) Description of the Related Art

Long line fishing implies a fishing method of hooking fishes by releasing and rolling a main line having a length of 180 to 540 m connected with strings with a snood arranged at a distance of 1 to 1.2 m, depending on the current of water.

Fishes living in the high seas, such as tunas and codfishes are mostly caught by long line fishing. In order to prevent the strings with fishes hooked from winding on the main line in the long line fishing, a sleeve is rotatably fitted on the main line, the string is connected to the sleeve through a swivel, and stoppers are provided to prevent the sleeve from longitudinally moving on the main line.

As an example, long line fishing implements disclosed in U.S. Pat. No. 4,945,671, has a configuration in which cylinders are fixed to a main line at regular intervals and sleeves divided in two pieces are rotatably fitted on the external circumference of the cylinders such that a string directly connected to the sleeves can rotate about the main line.

Further, long line fishing implements disclosed in U.S. Pat. No. 5,666,759, has a structure in which sleeves are roundly wound on a main line and both ends, with both ends fastened to each other and bent not to be separated, without using a cylinder, and swivels are interposed to connect a string.

Further, long line fishing implements disclosed in U.S. Pat. No. 5,926,996, has a structure in which sleeves are roundly wound directly on a main line without using a cylinder, but both ends are just in close contact with each other and only one end is cut-out by a press to form a hook extending outward to hang a swivel.

Further, long line fishing implement disclosed in U.S. Pat. No. 6,508,030, has a configuration in which sleeves are roundly wound on the external circumference of a main line such that both ends face each other and one end is formed longer than the other end to form a buckle to hang a swivel.

The above information disclosed in this Background section is only for enhancement of understanding of the background of the invention and therefore it may contain information that does not form the prior art that is already known in this country to a person of ordinary skill in the art.

SUMMARY OF THE INVENTION

As can be seen from Patent Documents described above, the long line fishing implements have a structure in which cylinders are fitted first on the main line and the sleeves are fitted on the cylinder to connect the string to be rotatable around the main line, and a structure in which sleeves are rotatably and roundly wound directly on the main line, without using a cylinder, and longitudinal movement of the main line is prevented by stoppers.

Although removing the cylinders may simplify the manufacturing process and reduce the number of parts, both ends of the sleeve are wound on the main line to face each other. Therefore, both ends may be opened and the sleeve may separate from the main line, when pulling force applied by a hooked fish for its life is transmitted in the radial direction of the main line.

In detail, dynamic load of 100 to 300 kg is applied through the string, when a tuna or a codfish is hooked, and the load is exerted in the perpendicular direction to both ends facing each other in the radial direction of the main line of the sleeve, which is the maximum load. Therefore, the sleeves deform and separate from the main line by repetition of this load.

In this case, fastening and bending both ends of the sleeve to each other prevents easy separation, but the portion between both ends of the sleeve cannot be formed in an arc shape, such that friction and abrasion with the main line are generated, thereby reducing the life span.

Therefore, the sleeve used in long line fishing should be structurally strong against external force not to be deformed, and should be improved to rotate about the main line without resistance.

The present invention has been made in an effort to provide long line fishing having a tubular sleeve that has a cross section close to a real circle such that it rotates on the external circumference of a main line with friction with the main line, without separating from the main line no matter how large force may be radially applied after being fitted on the main line.

Further, the present invention has been made in an effort to provide long line fishing having a swivel connected to the tubular sleeve, in which the swivel has a simple connection hook for quickly and easily connecting a string.

The present invention may be implemented by fitting a plurality of tubular sleeves on a long main line at predetermined positions, disposing clover stoppers at both sides of the tubular sleeves at predetermined positions on the main line to prevent the tubular sleeves from longitudinally moving, and protruding a hook at one side of the external circumference of the tubular sleeves.

An upper ring of the swivel is connected to the hook of the sleeve, and the present invention may be implemented by forming a split head divided in half at a lower ring disposed in the swivel to be rotatable with respect to the upper ring, to be integrally connected to the swivel and pivot.

Further, in the present invention, the swivel may have a simple connection hook formed of a spring bar formed by bending and twisting the end of the lower ring in an ∩-shape from the loop where the string is hung to press the bending end of the lower ring.

Further, in the simple connection hook, the loop of the lower ring may have sufficient toughness by forging.

Further, in the present invention, a bushing may be further disposed on the internal circumference of the tubular sleeve.

Further, in the present invention, the tubular sleeve may be formed by cutting a stainless pipe in a predetermined length, which has not slit and junction on the external circumference.

In this configuration of the present invention, the hook protruding outward from the tubular sleeve may be formed by punching, and for this configuration, a hole may be formed through the external circumference of the tubular sleeve to allow a machining tool, such as a punch, to be inserted from the opposite side to the hook.

Further, in the present invention, the clover stopper is roundly wound with one side open on the main line, and then may fixed by clamping with a mold such that four protrusions are formed.

Since the tubular sleeve of the present invention has a circular cross section without a slit or a junction, it is not separated from the main line after being fixed thereto no matter how large force is applied from the outside. Therefore, it is possible to achieve successful fishing and increase the life span of the main line without damaged due to friction, because the tubular sleeve rotated on the external circumference of the main line by a hooked fish does not generate friction.

Further, since the lower ring having the split head can smoothly pivot in the swivel, it is possible to prevent the main line from twisting. In addition, since the split head is supported by pressing the swivel from the outside, the split head is firmly connected without separating from the swivel even if large pulling force is applied by a hooked fish.

Further, in the example having the simple connection hook, since the string can be quickly and easily hung to the loop by the spring bar of the lower ring, it is possible to simply and efficiently prepare the implements for work and improve the work efficiency.

Further, in the present invention, the tubular sleeve may be formed of a stainless pipe that is not corroded by salt, such that the tubular sleeve are not corroded even if it is applied to long span fishing implements for fishery in the sea, thereby increasing the life span.

DETAILED DESCRIPTION OF THE EMBODIMENTS

The present invention will be described more fully hereinafter with reference to the accompanying drawings, in which exemplary embodiments of the invention are shown.

Figure 1:
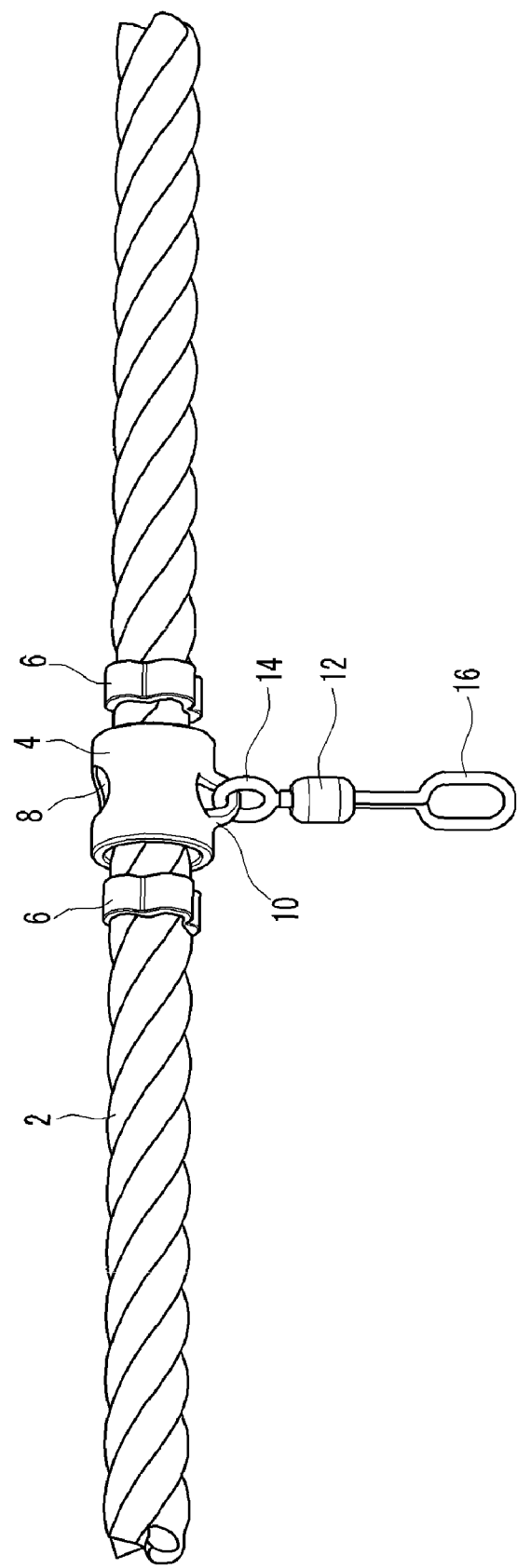
FIG. 1 is a perspective view showing an exemplary embodiment of the present invention.

Referring to FIG. 1, for long line fishing connector according to an exemplary embodiment of the present invention, tubular sleeves 4 are fitted on a long main line 2 at predetermined distances, clover stoppers 6 are locked on the main line 2 at both sides of the tubular sleeve 4 to prevent the tubular sleeve 4 from moving longitudinally on the main line 2. The tubular sleeve 4 is formed by cutting a stainless pipe in a predetermined length and forming a hole 8 and a hook 10 opposite to each other on the external circumference, such that it has a circular cross section close to a real circle without a slit or a junction on the external circumference.

Further, an upper ring 14 of a swivel 12 is hung to the hook 10 of the tubular sleeve 4. It is preferable the upper ring 14 is hung not to separate, as shown in the figure, by hanging a hook with a side open to the hook 10 and then connecting the open side by welding.

The swivel 12 has a lower ring 16 at the opposite side to the upper ring 14 and the lower ring 16 can rotate with respect to the upper ring 14.

In the present invention, the tubular sleeve 4 may be formed by cutting a stainless pipe in a predetermined length, such that the tubular sleeve 4 has a circular cross section close to a real circle without a slit of junction where both ends face each other.

The tubular sleeve 4 having a circular cross section does not cause a problem due to friction when rotating on the main line 2.

Figure 2:
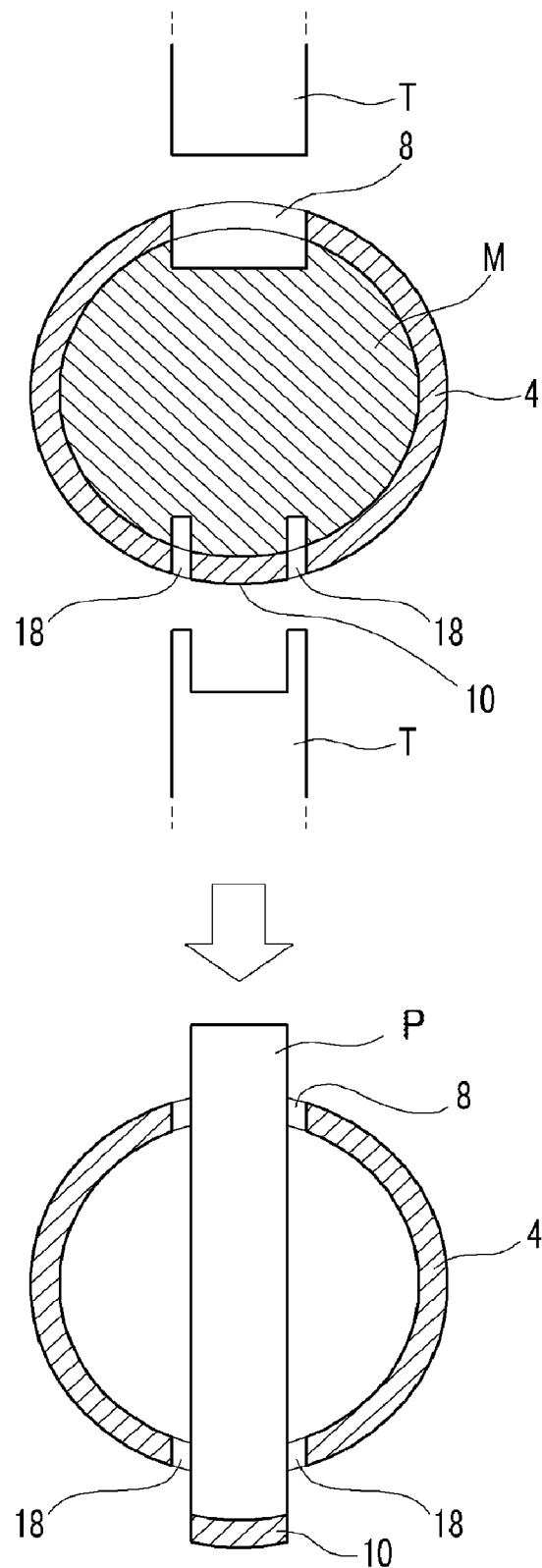
FIG. 2 is a view illustrating a process of manufacturing the sleeve shown in FIG. 1.

The tubular sleeve 4 having the structure described above, as shown in FIG. 2, may be manufactured by inserting a support die M into a stainless pipe, striking the pipe from the outside with a machining tool T such that two slits 18 are formed where the hook 10 is formed and one hole 8 is formed at the opposite side, removing the support die M and striking the inner side through the hole 8 with a punch P such that the hook 10 protrudes outward, and then cutting the pipe in a predetermined length.

The tubular sleeve 4 having a circular cross section without a slit or a junction on the circumference is achieved by striking and cutting a stainless pipe, as described above.

Figure 3:
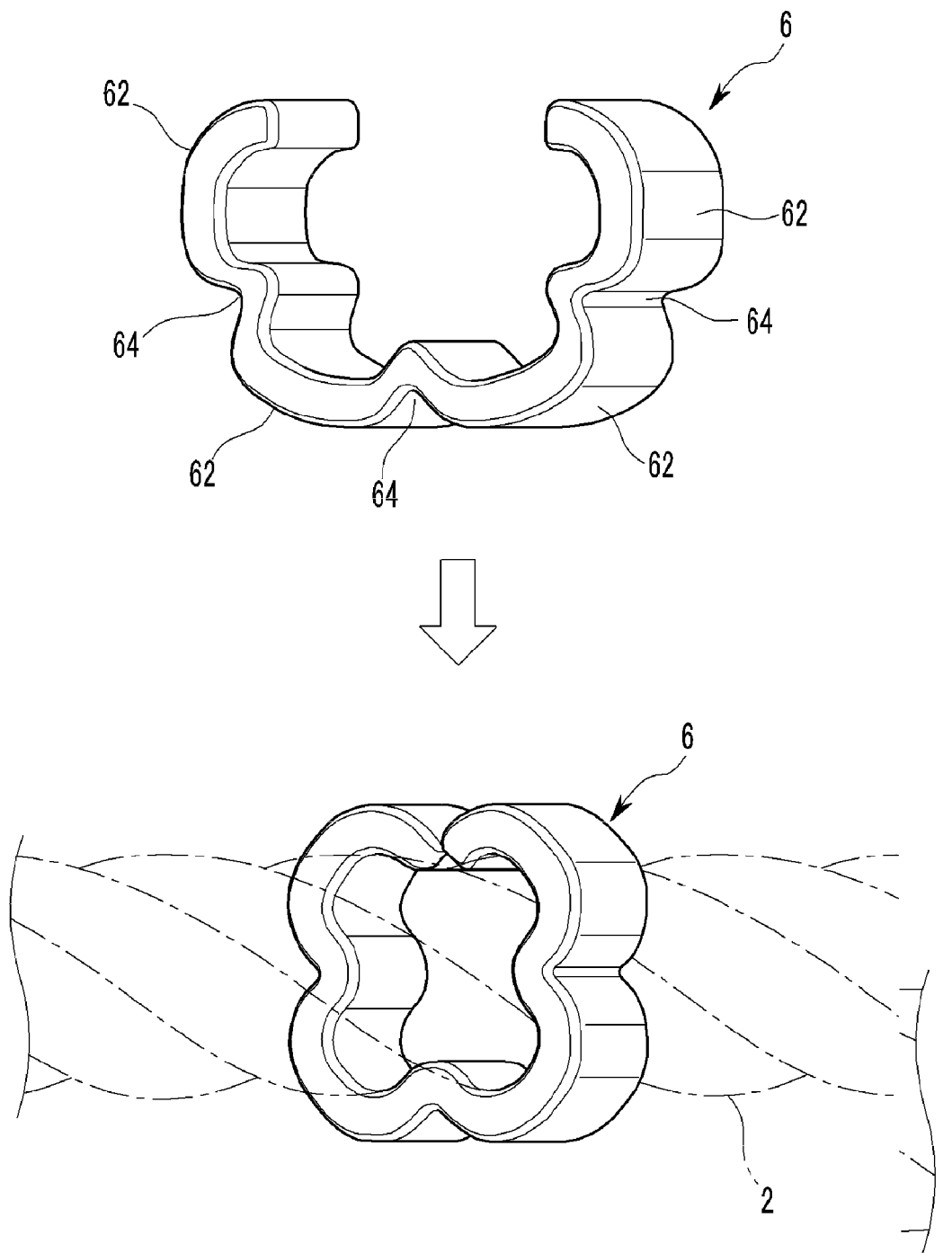
FIG. 3 is a view illustrating an example of locking the clover stopper on the main line shown FIG. 1.

Meanwhile, the clover stopper 6 locked on the main line 2, as shown in FIG. 3, is very firmly locked with depressions 64 pressing the external circumference of the main line 2, by winding the clover stopper, having alternate protrusions 62 and depressions 64 with a side open before being locked, on the external circumference of the main line 2 and clamping it in a predetermined mold such that four protrusions 62 are formed.

Figure 4:
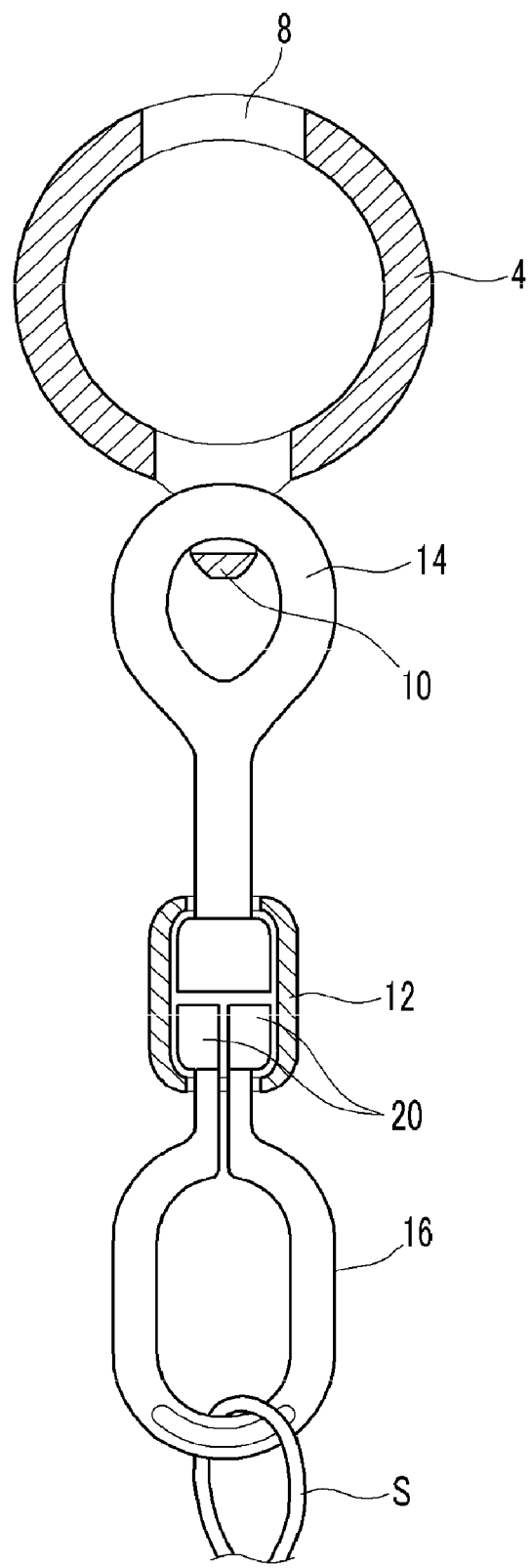
FIG. 4 is a cross-sectional view showing an example of the structure of a swivel hanging from the sleeve shown in FIG. 1.

FIG. 4 is a cross-sectional view showing an example of connecting the lower ring 16 to the swivel 12 to be rotatable with respect to the upper ring 14.

The upper ring 14 and the lower ring 16 are disposed opposite to each other in the swivel 12, but the upper ring 16 has a split head 20 divided at the center, which makes it possible to hang a string S to the lower ring through the split head 20 before assembly, insert the split head into the swivel 12, and then pressing it from the outside to be rotatably assembled.

In the present invention, the lower ring 16 of the swivel 12 does not have to have the configuration shown in FIG. 4 and may be modified in various structures.

Figure 5:
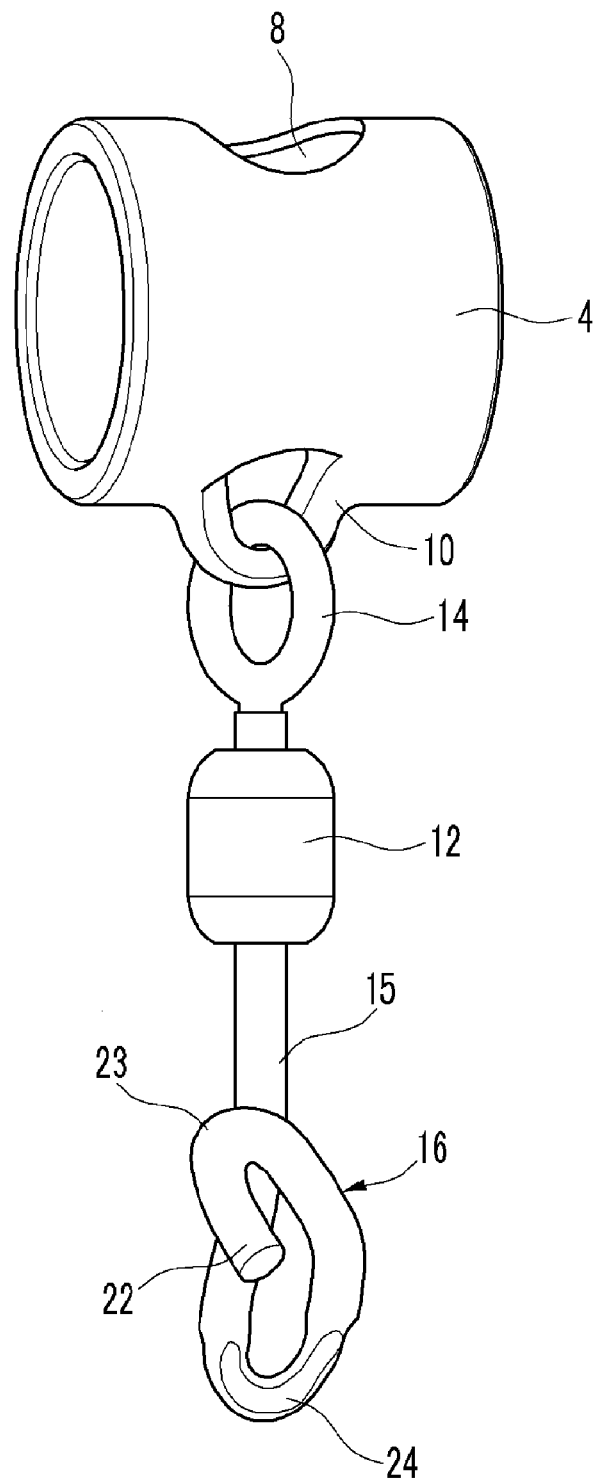
FIG. 5 is a perspective view showing another example of the structure of the swivel.

FIG. 5 shows another example of the lower ring 16. The lower ring 16 shown in the figure is formed of a spring bar 22 having a bending end 23 in an ∩-shape and twisted to press the bending end 23, such that lower ring 16 of this exemplary embodiment provides a simple connection hook where the string S can be easily hung at a work place by the spring bar 22.

Figure 6:
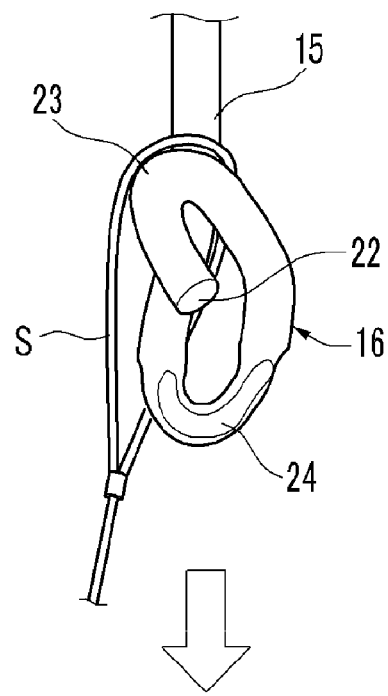
FIG. 6 is a view illustrating a process of connecting a string to a lower ring of the swivel shown in FIG. 5.
Figure 6:
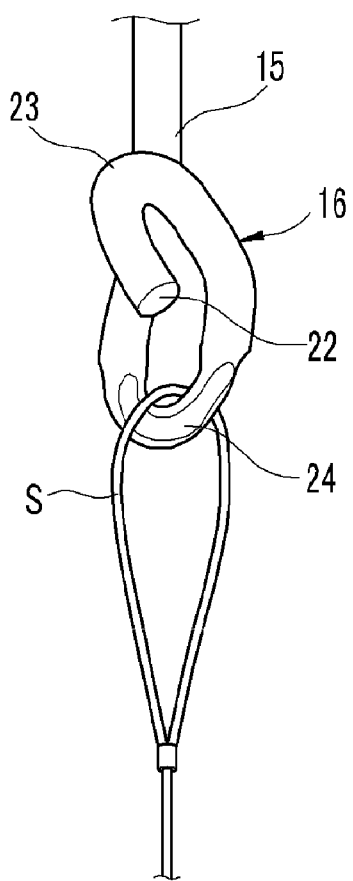

The lower ring 16 formed of a simple connection hook is closed by the spring bar 22 in a normal state, but, as shown in FIG. 6, it is possible to quickly and simply connect the string S in the work place by putting a connection portion of the string S to the spring bar 22 and pulling down the string such that the connection portion forcibly passing through between the bending end of the lower ring 16 and the spring bar 22.

Meanwhile, since the lower ring 16 formed of a simple connection hook can be open at one side by the spring bar 22, the loop 24 may be deformed by external force; therefore, it is required to take a proper measure against the deformation.

In the present invention, in order to remove this problem, the loop 24 is reinforced by strongly pressing the portion with a forging device such that the portion become dense and toughness increases about two times, such that it has sufficient strength against force applied by fishes for its life.

Further, the spring bar 22 bending the ∩-shape and the loop 24 can attenuate the pulling force transmitted through the string S from a hooked fish, using their own elasticity, such that they prevent damage to the tubular sleeve 4, the swivel 12, and the parts, where the pulling force is directly applied.

Figure 7:
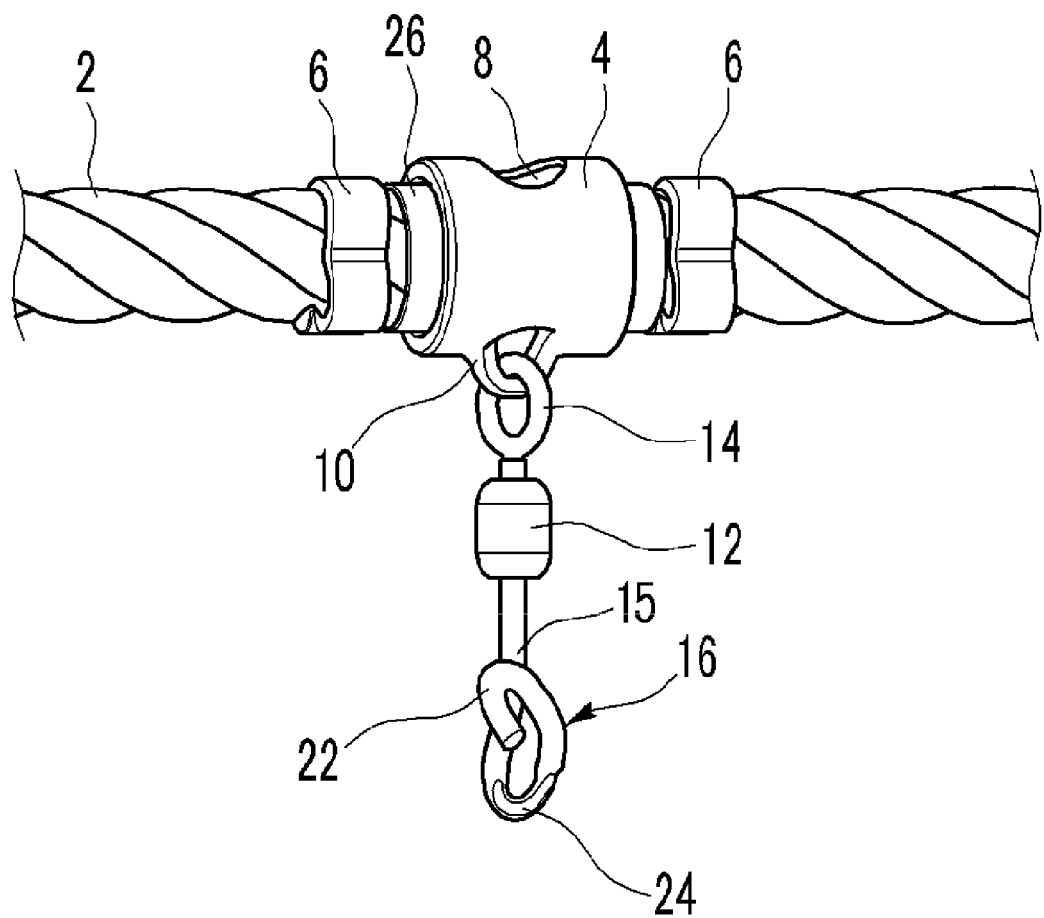
FIG. 7 is a perspective view showing a configuration in which a bushing is inserted in a sleeve according to another exemplary embodiment of the present invention.

The long line fishing connector of the present invention is not limited to the exemplary embodiment described above, and as shown in FIG. 7, it is possible to fit the bushing 26 on the main line 2 before fitting the tubular sleeve 4 on the main line 2, and then disposing the tubular sleeve 4 on the bushing.

As described above, when the busing 26 is fitted on the main line 2 and then the tubular sleeve 4 is disposed around the external circumference of the bushing, the internal circumference of the tubular sleeve 4 becomes smooth by the bushing 26, such that rotation is smooth. Accordingly, it is possible to more surely prevent the string S from winding around the external circumference of the main line 2, and particularly, it is possible to prevent damage due to abrasion and considerably increase the life span, because the surface of the main line 2 is not in direct contact with the tubular sleeve 4.

There may be a case that required to take emergency measures in long line fishing at the work place, when the clover stopper 6 is separated from the main line 2 or broken, such that it fails to do its function in working.

Figure 8A:
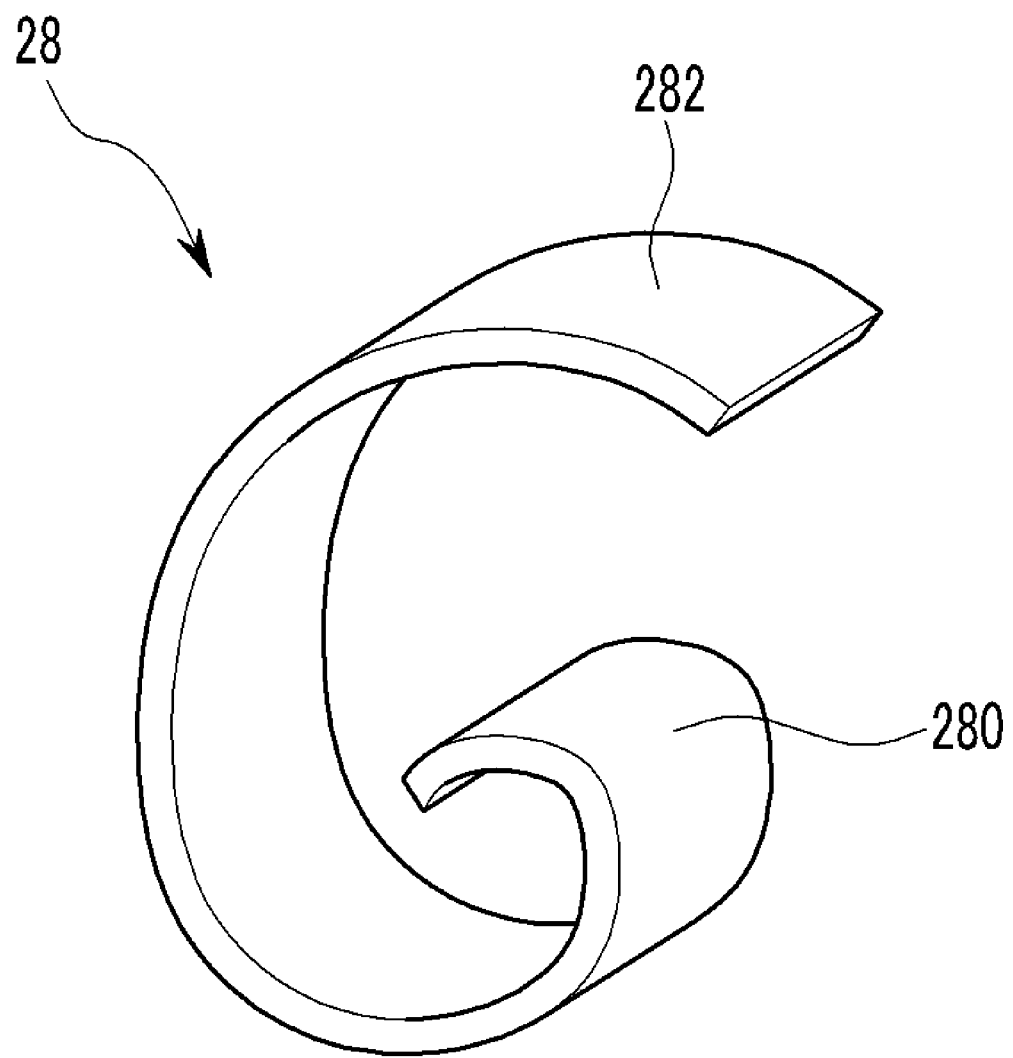
FIG. 8A is a perspective view showing an example of a stopper repairing part suitable for long line fishing connector of the present invention.

The long line fishing connector of the present invention makes it possible to take emergency measures for damage of the clover stopper 6 described above with a stopper repairing part 28, as shown in FIG. 8A.

Figure 8B:
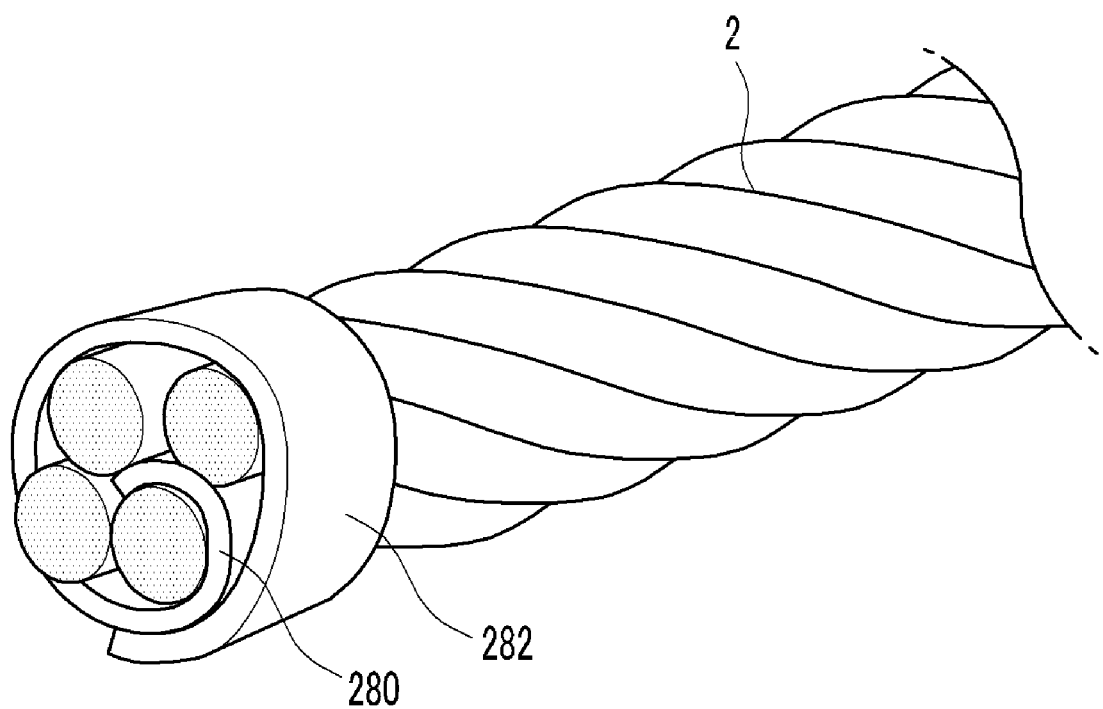
FIG. 8B is a cross-sectional perspective view illustrating a use of the stopper repairing part.

The stopper repairing part 28 having a holding portion 280 formed by rolling one end in a semicircular shape and a bending portion 282 extending in an arc shape having a large diameter at the other end. As shown in FIG. 8B, an emergency measure using the stopper repairing part 28 is made by holding supporting the holding portion 280 to one strand of the main line 2 and winding the bending portion 282 around the main line 2 with a tool (not shown).

| <Description of symbols> | |
|---|---|
| 2: | Main line |
| 4: | Round frame sleeve |
| 6: | Clover stopper |
| 8: | Hole |
| 10: | Hook |
| 12: | Swivel |
| 14: | Upper ring |
| 16: | Lower ring |
| 18: | Slit |
| 20: | Split head |
| 22: | Spring bar |
| 24: | Loop |
| 26: | Bushing |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. Long line fishing connector, comprising: a plurality of tubular sleeves regularly fitted on a long main line; each of said plurality of tubular sleeves comprising a stainless pipe and including: clover stoppers fitted on the main line at both sides of the tubular sleeve; a hook protruded outside the tubular sleeve; and a swivel having an upper ring connected to the hook and a lower ring having a split head and rotatably connected thereto; wherein the tubular sleeve has a hole and two slits on an external circumference of the sleeve to form the hook; and the tubular sleeve has a continuous circular cross section without a junction on the external circumference.

2. The long line fishing connector of claim 1 wherein: a bushing is disposed in each of said plurality of tubular sleeves disposed on the main line.

3. Long line fishing connector, comprising: a plurality of tubular sleeves regularly fitted on a long main line; each of said plurality of tubular sleeves comprising a stainless pipe and including: clover stoppers fitted on the main line at both sides of the tubular sleeve; a hook protruded outside the tubular sleeve; and a swivel having an upper ring connected to the hook and a lower ring rotating with respect to the upper ring and formed of a spring bar having a bending end, the bending end is twisted in an inverted U-shape to be in close contact with a loop portion of the lower ring; wherein the tubular sleeve has a hole and two slits on an external circumference of the sleeve to form the hook; and the tubular sleeve has a continuous circular cross section without a junction on the external circumference.

* * * * *